(12) United States Patent
Park et al.

(10) Patent No.: US 12,743,714 B2
(45) Date of Patent: Sep. 22, 2026

(54) METHOD, SYSTEM, AND RECORDING MEDIUM FOR EXPANDING AND UTILIZING DATA USING PSEUDONYMOUS ASSOCIATION

(71) Applicant: NAVER Corporation, Seongnam-si (KR)

(72) Inventors: Yeunha Park, Seongnam-si (KR); SoHyun Park, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 272 days.

(21) Appl. No.: 18/491,285

(22) Filed: Oct. 20, 2023

(65) Prior Publication Data

US 2024/0144321 A1 May 2, 2024

(30) Foreign Application Priority Data

Oct. 28, 2022 (KR) ........................ 10-2022-0141263

(51) Int. Cl.
*G06Q 30/0251* (2023.01)
*G06F 21/62* (2013.01)
(Continued)

(52) U.S. Cl.
CPC ..... *G06Q 30/0255* (2013.01); *G06F 21/6254* (2013.01); *G06Q 30/0201* (2013.01); *G06Q 30/0277* (2013.01)

(58) Field of Classification Search
CPC ........... G06Q 30/0255; G06Q 30/0201; G06Q 30/0277; G06F 21/6254
(Continued)

(56) References Cited

U.S. PATENT DOCUMENTS 7,844,717 B2 * 11/2010 Herz .................. G06F 21/6254 709/229
2008/0243821 A1 * 10/2008 Delli Santi ......... G06F 16/9537 707/999.005
(Continued)

FOREIGN PATENT DOCUMENTS

JP 2015069532 A 4/2015
KR 10-2008-0043764 A 5/2008
(Continued)

OTHER PUBLICATIONS

Ralf “Anonos: Embedding Privacy and Trust Into Data Analytics Through Pseudonymisation ”, Aug. 2020, IDC Opinion, pp. 1-8 ( Year: 2020).*

(Continued)

*Primary Examiner* — Romain Jeanty
(74) *Attorney, Agent, or Firm* — Greer, Burns & Crain, Ltd

(57) ABSTRACT

Disclosed are a method, a system, and a recording medium for expanding and utilizing data using pseudonym association. The method of expanding and utilizing data using pseudonym association includes receiving pseudonym association data in which first-party information of a customer company and third-party information of an entity other than the customer company are pseudonymized and combined;

(Continued)

generating an interpretation model for data estimation by modeling the pseudonym association data; estimating the third-party information using target information of the customer company through the interpretation model; and providing the estimated third-party information for a service related to the customer company.

18 Claims, 10 Drawing Sheets

(51) Int. Cl.
*G06Q 30/0201* (2023.01)
*G06Q 30/0241* (2023.01)

(58) Field of Classification Search
USPC .............................................. 705/3–44, 7.29
See application file for complete search history.

(56) References Cited

U.S. PATENT DOCUMENTS

2013/0091581 A1* 4/2013 Pirani .................... G06F 21/31 726/26
2014/0041047 A1 2/2014 Jaye et al.
2017/0132431 A1* 5/2017 Gonzalez Blanco ........................ H04L 63/0838
2020/0184515 A1* 6/2020 deWet ................ G06Q 30/0251
2022/0147655 A1* 5/2022 Komatsu ............... H04L 9/0643

FOREIGN PATENT DOCUMENTS

WO WO-2011070393 A1 * 6/2011 ......... H04L 63/0421
WO WO-2013007686 A1 * 1/2013 ........... H04L 63/102
WO WO-2020167861 A1 * 8/2020 ......... G06Q 30/0269
WO 2020240888 A1 12/2020

OTHER PUBLICATIONS

Youngju Lee et al.; "A study on the range of user information collection and use for customized advertisements on global digital platforms Focusing on Google, Facebook, and Amazon" Korea Information Society; Dec. 2020, vol. 21, No. 3, pp. 89-119.
Office Action issued in corresponding Korean patent application No. 10-2022-0141263, dated Aug. 19, 2024.
Dimitri Delcaillau et al. ; "Interpretabilite Des : Modeles Etat Des Lieux Des Methodes et Application a Lassurance"; A Preprint, Jul. 28, 2020; pp. 1-31.
Search report issued in corresponding European patent application No. 23206542.5, dated Feb. 28, 2024.

* cited by examiner

FIG. 4

Company A pseudonym data: segment information for each customer of Company A

| Pseudonym association key | $A_1$ | $A_2$ | $A_3$ | $A_4$ |
|---|---|---|---|---|
| key1 | | | | |
| key3 | | | | |
| key4 | | | | |
| key5 | | | | |
| key6 | | | | |
| key7 | | | | |
| key8 | | | | |
| key9 | | | | |
| key12 | | | | |
| key13 | | | | |

Company B pseudonym data: advertising target information of Company B

| Pseudonym association key | $B_1$ | $B_2$ | $B_3$ |
|---|---|---|---|
| key1 | | | |
| key2 | | | |
| key4 | | | |
| key5 | | | |
| key6 | | | |
| key7 | | | |
| key8 | | | |
| key10 | | | |
| key11 | | | |
| key12 | | | |
| key14 | | | |
| key15 | | | |
| key16 | | | |

FIG. 5

Pseudonym association data

| Pseudonym association key | $A_1$ | $A_2$ | $A_3$ | $A_4$ | $B_1$ | $B_2$ | $B_3$ |
|---|---|---|---|---|---|---|---|
| key1 | | | | | | | |
| key4 | | | | | | | |
| key5 | | | | | | | |
| key6 | | | | | | | |
| key7 | | | | | | | |
| key8 | | | | | | | |
| key12 | | | | | | | |

FIG. 6

Pseudonym association data

| Pseudonym association key | $A_1$ | $A_2$ | $A_3$ | $A_4$ | $B_1$ | $B_2$ | $B_3$ |
|---|---|---|---|---|---|---|---|
| key1 | | | | | | | |
| key4 | | | | | | | |
| key5 | | | | | | | |
| key6 | | | | | | | |
| key7 | | | | | | | |
| key8 | | | | | | | |
| key12 | | | | | | | |

Pseudonym association data

| $A_1$ | $A_2$ | $A_3$ | $A_4$ | $B_1$ | $B_2$ | $B_3$ |
|---|---|---|---|---|---|---|
| | | | | | | |
| | | | | | | |
| | | | | | | |
| | | | | | | |
| | | | | | | |
| | | | | | | |
| | | | | | | |

| | $A_1$ | $A_2$ | … | $A_n$ | $B_1$ | … | $B_m$ |
|---|---|---|---|---|---|---|---|
| $U_1$ | | | | | | | |
| $U_2$ | | | | | | | |
| $U_3$ | | | | | | | |
| … | | | | | | | |
| $U_k$ | | | | | | | |

Interpretation model $N_i$

FIG. 10

| | Input (Company A data) | | | | Output (Estimated Company B data) | | |
|---|---|---|---|---|---|---|---|
| | $A_1$ | $A_2$ | $A_3$ | $A_4$ | $N_1$ | $N_2$ | $N_3$ |
| Customer of Company A | | | | | | | |
| | | | | | | | |
| | | | | | | | |
| | | | | | | | |
| | | | | | | | |
| | | | | | | | |
| | | | | | | | |

METHOD, SYSTEM, AND RECORDING MEDIUM FOR EXPANDING AND UTILIZING DATA USING PSEUDONYMOUS ASSOCIATION

CROSS-REFERENCE TO RELATED APPLICATION(S)

This U.S. non-provisional application claims the benefit of priority under 35 U.S.C. § 119 to Korean Patent Application No. 10-2022-0141263 filed on Oct. 28, 2022, in the Korean Intellectual Property Office (KIPO), the entire contents of which are incorporated herein by reference.

BACKGROUND OF THE INVENTION

Field of Invention

One or more example embodiments of the following description relate to technology for utilizing third-party data.

Description of Related Art

A company sets an advertising exposure target or provides an individually customized advertisement based on understanding of its own customers.

One example of technology for providing targeted advertising, and technology for selecting preferred advertising using a profile of a user, is described in Korean Patent Laid-Open Publication No. 10-2008-0043764 (published on May 19, 2008).

Most companies do not have enough information on their own customers and so use information from other companies (that is, third parties) to improve their understanding of the customers.

Examples of a method of securing information of another company, that is, third-party information, include a method of connecting and using data of a corresponding company (first-party data) and data of another company (third-party data) using third-party cookies, and a method of using data provided with consent from a customer (second-party data).

However, recent measures to strengthen personal information protection have made it difficult to use third-party data using cookies, making it difficult to secure customer data.

BRIEF SUMMARY OF THE INVENTION

One or more example embodiments may involve systems and methods that continuously and legally utilize third-party data, while protecting individual privacy through pseudonym association.

One or more example embodiments may involve systems and methods that recommend current information by constructing a model configured to estimate third-party data with first-party data using pseudonym association data.

One or more example embodiments may involve systems and methods that expand the data intended to be utilized by estimating third-party data through a model constructed using pseudonym association data.

One or more example embodiments may apply to enhancing targeting, such as advertising execution and personalized recommendation, through a combination of not only first-party data but also third-party data estimated through a pseudonym association-based model.

According to at least one example embodiment, there is provided a third-party data providing method performed by a computer system including at least one processor configured to execute computer-readable instructions included in a memory, the method including receiving, by the at least one processor, pseudonym association data in which first-party information of a customer company and third-party information of an entity other than the customer company are pseudonymized and combined; generating, by the at least one processor, an interpretation model for data estimation by modeling the pseudonym association data; estimating, by the at least one processor, the third-party information using target information of the customer company through the interpretation model; and providing, by the at least one processor, the estimated third-party information for a service related to the customer company.

The generating may include pseudonymizing and de-identifying the pseudonym association data.

The generating may include de-identifying the pseudonym association data through at least one of a process of smoothing the pseudonym association data and a process of adding an error to the pseudonym association data.

The generating may include generating the interpretation model through a method of summarizing the pseudonym association data in a table form, a method of summarizing the pseudonym association data using similarity between items, or a method of modeling the pseudonym association data using a logistic regression model or a deep learning model.

The generating may include deleting the pseudonym association data after generation of the interpretation model is completed.

The providing may include providing the customer company with expanded data in which the target information and the estimated third-party information are connected (i.e., associated with each other).

The providing may include utilizing the target information and the estimated third-party information for advertising targeting for the customer company.

The estimating may include estimating third-party data using first-party data of a target customer of the customer company using the interpretation model, and the providing may include defining expanded data in which the first-party data and the third-party data are connected as an advertising targeting option for the target customer.

The receiving may include receiving pseudonym association data in which a pseudonym association key is deleted from an external specialized association agency.

The receiving may include receiving the pseudonym association data in which pseudonym data of the customer company and pseudonym data of at least one third party selected as a target company for information use by the customer company are combined.

According to at least one example embodiment, there is provided a non-transitory computer-readable recording medium storing instructions that, when executed by a processor, cause the processor to computer-implement the third-party data providing method.

According to at least one example embodiment, there is provided a computer system including at least one processor configured to execute computer-readable instructions included in a memory. The at least one processor is configured to process a process of receiving pseudonym association data in which first-party information of a customer company and third-party information of an entity other than the customer company are pseudonymized and combined; a process of generating an interpretation model for data estimation by modeling the pseudonym association data; a process of estimating the third-party information using target information of the customer company through the interpretation model; and a process of providing the estimated third-party information for a service related to the customer company.

According to some example embodiments, it is possible to continuously and legally estimate and utilize third-party data while protecting individual privacy through pseudonym association.

According to some example embodiments, it is possible to secure accuracy of a model and ensure up-to-dateness of data by constructing the model configured to estimate third-party data with first-party data using pseudonym association data.

According to some example embodiments, it is possible to expand the data intended to be utilized by estimating third-party data using a link between data through a model constructed using pseudonym association data.

According to some example embodiments, it is possible to apply the resultant data to enhanced targeting, such as various advertising executions and personalized recommendations, through a combination of not only first-party data but also third-party data estimated through a pseudonym association-based model.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein:

FIG. 4 illustrates an example of describing a process of pseudonymizing data of each company according to at least one example embodiment;

FIGS. 5 and 6 illustrate examples of describing pseudonym association data in which pseudonym data of each company is combined according to at least one example embodiment;

FIGS. 9 and 10 illustrate examples of describing a data expansion process using an interpretation model according to at least example embodiment.

Figure 1:
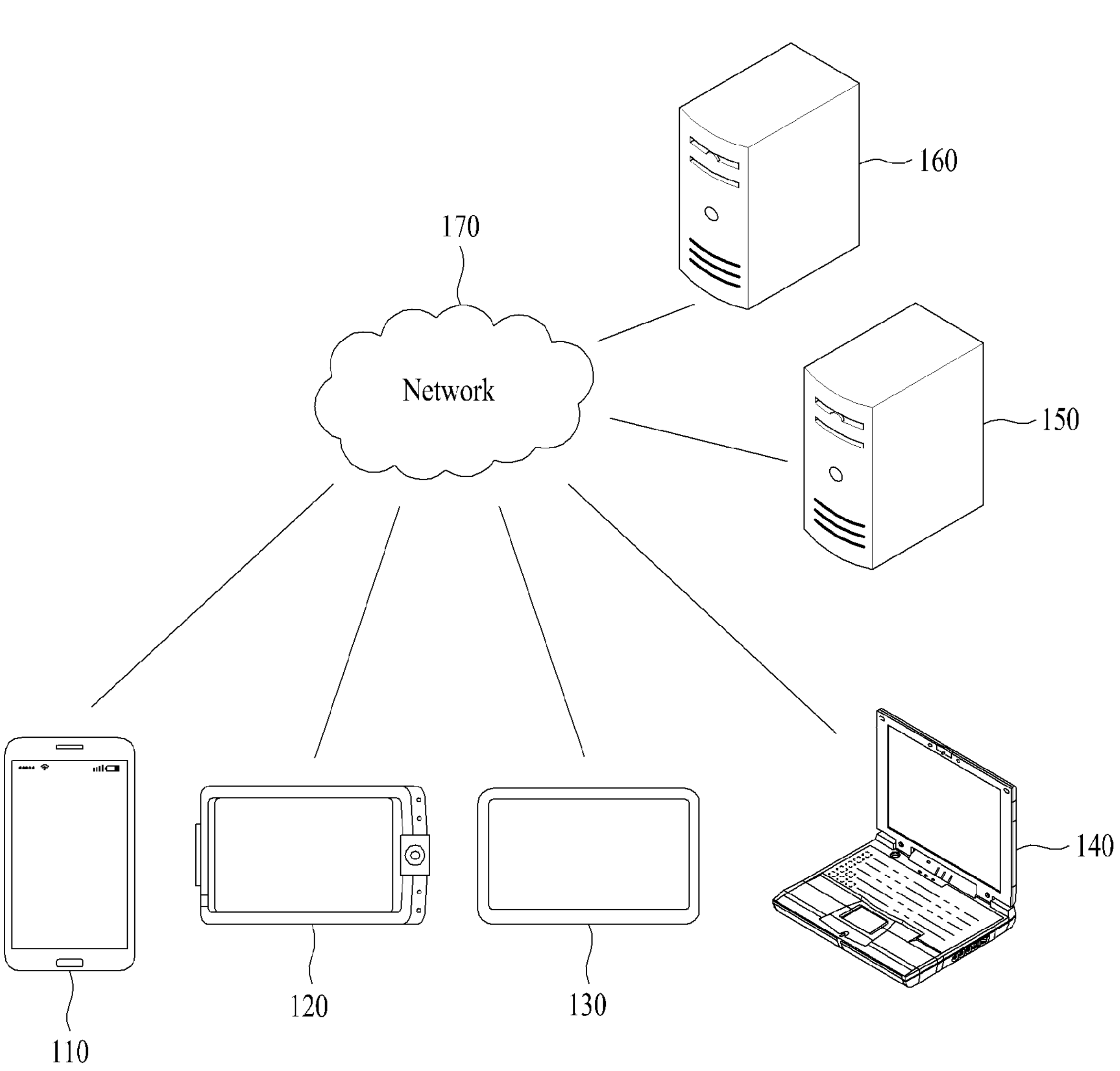
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms “first,” “second,” “third,” etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as “beneath,” “below,” “lower,” “under,” “above,” “upper,” and the like, may be used herein for ease of description to describe one element or feature’s relationship to another element(s) or feature s) as illustrated in the figures. It will be understood that the spatially relative terms are intended to encompass different orientations of the device in use or operation in addition to the orientation depicted in the figures. For example, if the device in the figures is turned over, elements described as “below,” “beneath,” or “under,” other elements or features would then be oriented “above” the other elements or features. Thus, the example terms “below” and “under” may encompass both an orientation of above and below. The device may be otherwise oriented (rotated 90 degrees or at other orientations) and the spatially relative descriptors used herein interpreted accordingly. In addition, when an element is referred to as being “between” two elements, the element may be the only element between the two elements, or one or more other intervening elements may be present.

As used herein, the singular forms “a,” “an,” and “the,” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups, thereof. As used herein, the term “and/or” includes any and all combinations of one or more of the associated listed products. Expressions such as “at least one of,” when preceding a list of elements, modify the entire list of elements and do not modify the individual elements of the list. Also, the term “exemplary” is intended to refer to an example or illustration.

When an element is referred to as being “on,” “connected to,” “coupled to,” or “adjacent to,” another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

The example embodiments relate to technology for utilizing data of another company, that is, third-party data.

The example embodiments including disclosures in detail may provide a platform capable of continuously and legally estimating and utilizing third-party data while protecting individual privacy through pseudonym association.

A third-party data providing system according to the example embodiments may be implemented by at least one computer system, and a third-party data providing method according to the example embodiments may be performed through the at least one computer system included in the third-party data providing system. Here, a computer program according to an example embodiment may be installed and executed on the computer system, and the computer system may perform the third-party data providing method according to the example embodiments under control of the executed computer program. The aforementioned computer program may be stored in a computer-readable storage medium to computer-implement the third-party data providing method in conjunction with the computer system.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. The number of electronic devices and the number of servers is not limited to the numbers provided in this example. Also, the network environment of FIG. 1 is provided as an example only among environments applicable to the example embodiments, and the environment applicable to the example embodiments is not limited to the network environment of FIG. 1.

Each of the plurality of electronic devices 110, 120, 130, and 140 may be a fixed terminal or a mobile terminal that is configured as a computer device. For example, each of the plurality of electronic devices 110, 120, 130, and 140 may be any one of a smartphone, a mobile phone, a navigation device, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, an augmented reality (AR) device, and the like. For example, although FIG. 1 illustrates the shape of a smartphone as an example of the electronic device 110, the electronic device 110 used herein may refer to any one of the various different types of physical computer systems capable of communicating with other electronic devices 120, 130, and 140, and/or the servers 150 and 160 over the network 170 in a wireless or wired communication manner.

The communication scheme is not limited, and may include a near field wireless communication scheme between devices, as well as a communication scheme using a communication network (e.g., a mobile communication network, wired Internet, wireless Internet, a broadcasting network, etc.) includable in the network 170. For example, the network 170 may include at least one of a number of different network topologies that include a personal area network (PAN), a local area network (LAN), a campus area network (CAN), a metropolitan area network (MAN), a wide area network (WAN), a broadband network (BBN), and the Internet. Also, the network 170 may include at least one of a variety of different network topologies that include a bus network, a star network, a ring network, a mesh network, a star-bus network, a tree or hierarchical network, and the like. However, these network topologies are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170, and the server 160 may be a system that provides a second service to the plurality of electronic devices 110, 120, 130, and 140 connected over the network 170. In detail, for example, the server 150 may provide a service, for example, a customer data platform service, desired by a corresponding application to the plurality of electronic devices 110, 120, 130, and 140, as the first service through the application as a computer program that is installed and executed on the plurality of electronic devices 110, 120, 130, and 140. As another example, the server 160 may provide a service for distributing a file for installation and execution of the aforementioned application to the plurality of electronic devices 110, 120, 130, and 140 as the second service.

Figure 2:
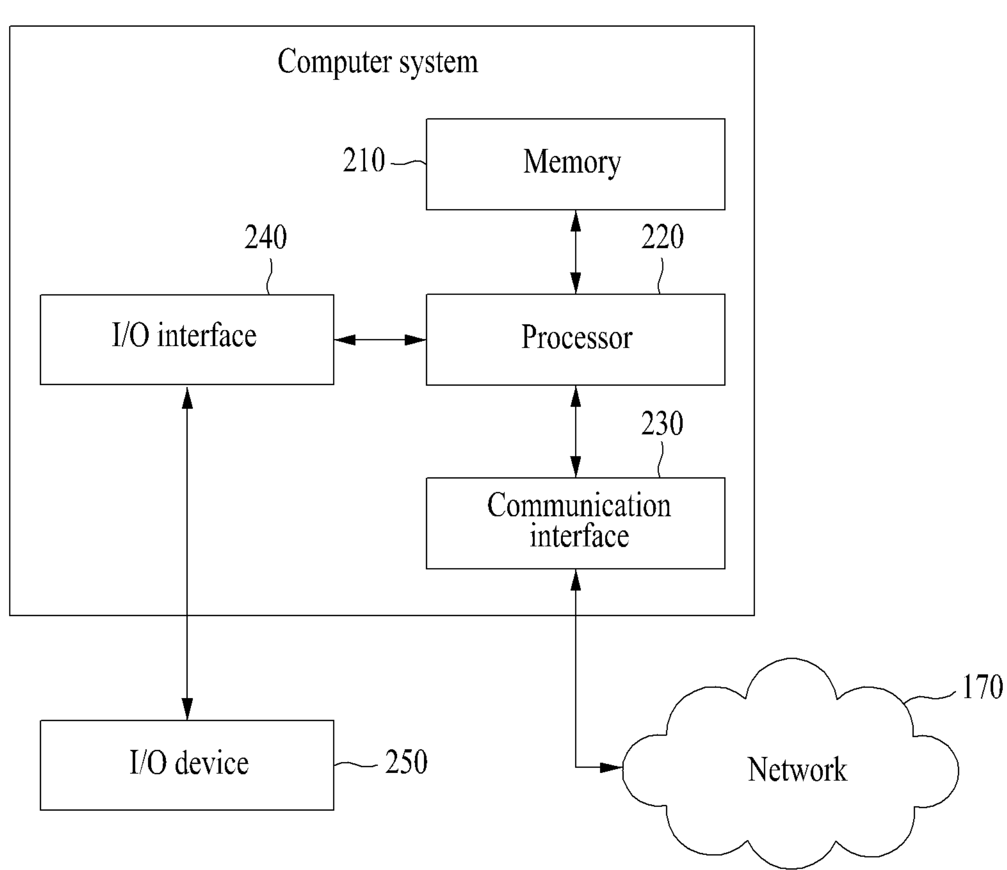
FIG. 2 is a diagram illustrating an example of a computer system according to at least one example embodiment.

FIG. 2 is a block diagram illustrating an example of a computer system according to at least one example embodiment. Each of the plurality of electronic devices 110, 120, 130, and 140 or each of the servers 150 and 160 may be implemented by a computer system 200 of FIG. 2.

Referring to FIG. 2, the computer system 200 may include a memory 210, a processor 220, a communication interface 230, and an input/output (I/O) interface 240.

The memory 210 may include a permanent mass storage device, such as a random access memory (RAM), a read only memory (ROM), and a disk drive, as a non-transitory computer-readable recording medium. The permanent mass storage device, such as ROM and a disk drive, may be included in the computer system 200 as a permanent storage device separate from the memory 210. Also, an OS (Operating System) and at least one program code may be stored in the memory 210. Such software components may be loaded to the memory 210 from another non-transitory computer-readable recording medium separate from the memory 210. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 210 through the communication interface 230, instead of the non-transitory computer-readable recording medium. For example, the software components may be loaded to the memory 210 of the computer system 200 based on a computer program installed by files received over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the communication system 200 and another device (for example, the aforementioned storage devices) over the network 170. For example, the processor 220 of the computer system 200 may forward a request or an instruction created based on program code stored in the storage device such as the memory 210, data, and a file, to other devices over the network 170 under control of the communication interface 230. Inversely, a signal, an instruction, data, a file, etc., from another device may be received by the computer system 200 through the communication interface 230 of the computer system 200 over the network 170. For example, a signal, an instruction, data, etc., received through the communication interface 230 may be forwarded to the processor 220 or the memory 210, and a file, etc., may be stored in a storage medium, for example, the permanent storage device, further includable into the computer system 200.

The I/O interface 240 may be a device used for interfacing with an I/O device 250. For example, an input device may include a device, such as a microphone, a keyboard, a mouse, etc., and an output device may include a device, such as a display, a speaker, etc. As another example, the I/O interface 240 may be a device for interfacing with a device in which an input function and an output function are integrated into a single function, such as a touchscreen. The I/O device 250 may be configured as a single device with the computer system 200.

According to other example embodiments, the computer system 200 may include a number of components greater than or less than the number of components shown in FIG. 2. However, there is no need to clearly illustrate many components according to the related art. For example, the computer system 200 may include at least a portion of the I/O device 250, or may further include other components, such as, for example, a transceiver, a database, etc.

Hereinafter, example embodiments of a method and system for expanding and utilizing data using pseudonym association are described.

For a company to utilize information of an entity such as another company, that is, third-party information, the company may employ a method of receiving corresponding information under consent from customers or matching data of different companies using third-party cookies or based on similarity of data.

The example embodiments relate to technology that may continuously estimate and utilize data of different companies as a method of constructing an interpretation model with legal data using a pseudonym association procedure.

The computer system 200 according to the example embodiment may provide a customer data platform service to a client through a dedicated application installed on the client or through connection to a website/mobile site related to the computer system 200.

The processor 220 may control the computer system 200 to perform operations included in a third-party data providing method described below. For example, the processor 220 and the components of the processor 220 may be implemented to execute an instruction according to code of at least one program and code of an OS included in the memory 210.

The processor 220 may read, from the memory 210, a necessary instruction to which instructions related to control of the computer system 200 have been loaded. In this case, the read instruction may include an instruction for controlling the processor 220 to perform the following third-party data providing method.

Operations included in the following third-party data providing method may be performed in an order that is different from the illustrated order, and/or one or more of the operations may be omitted. Alternatively, an additional process may be further included. Operations included in the third-party data providing method may be performed by the server 150. In certain example embodiments, at least a portion of operations may be performed by the client or another server, such as, for example, the server 160.

Figure 3:
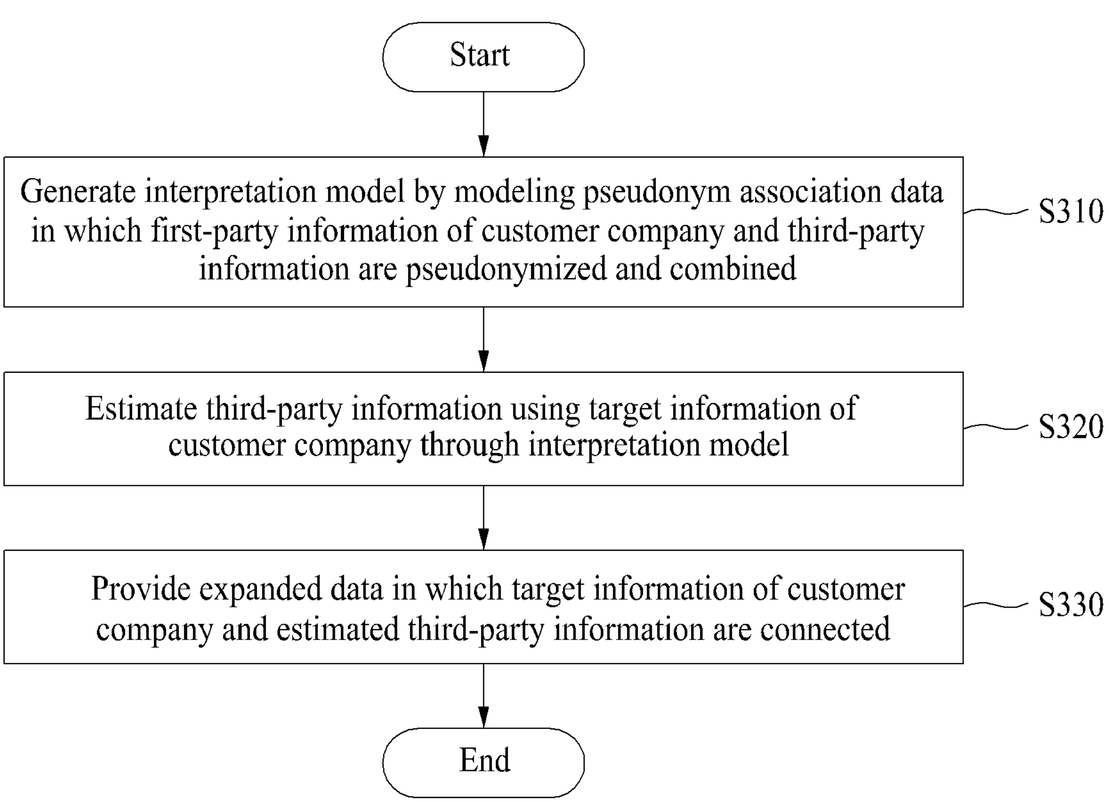
FIG. 3 is a flowchart illustrating an example of a third-party data providing method performed by a computer system according to at least one example embodiment.

FIG. 3 is a flowchart illustrating an example of a method performed by a computer system according to at least one example embodiment.

As a form of a service that targets companies, the server 150 implemented by the computer system 200 according to the example embodiment may provide a customer data platform that may utilize data of a customer company that is an entity other than the customer company (i.e., the customer company's own customer information) using the service and data of another company (also, referred to as third-party data) (e.g., customer information of the server 150 and customer information of an affiliated company linkable to the server 150) for advertising or marketing in a connected form.

Referring to FIG. 3, in operation S310, the processor 220 may generate an interpretation model for data estimation by modeling pseudonym association data in which first-party information of a customer company and third-party information (from and entity other than the customer company) are pseudonymized and combined. For example, the customer company may select at least one target company to be utilized through the customer data platform on the server 150, and then request construction of the interpretation model. Therefore, the processor 220 may request a third-party institution (such as an external specialized association agency designated by the government) for combination of pseudonym information with respect to data that is pseudonymized and provided from the customer company and the target company selected by the customer company. The processor 220 may receive pseudonym association data in which pseudonym data of the customer company and pseudonym data of the target company are combined from the specialized association agency. The processor 220 may construct a model for estimating third party (target company) data with customer company data as an input, a model for estimating customer company data with third-party data as an input, and the like, as the interpretation model for data estimation using the pseudonym association data. A method of modeling pseudonym association data between the customer company and the target company may utilize a method of summarizing the pseudonym association data in table form, a method of summarizing the pseudonym association data using similarity between items, or a method of modeling the pseudonym association data using a logistic regression model or a deep learning model. The processor 220 may delete the pseudonym association data received from the specialized association agency after constructing the interpretation model.

In operation S320, when target information is given from the customer company, the processor 220 may estimate third-party information using target information of the customer company through the interpretation model constructed in operation S310. That is, the processor 220 may predict third-party information corresponding to the target information of the customer company through the interpretation model using the target information of the customer company as an input of the interpretation model. For example, with the assumption that the interpretation model is constructed with pseudonym association data in which product purchase history of corresponding customers of Company A (customer company) and search history of corresponding customers of Company B (target company), the processor 220 may estimate the search history of Company B with the product purchase history of Company A for customers of Company A.

In operation S330, the processor 220 may provide the customer company with expanded data in which the target information of the customer company and the third-party information estimated with the target information through the interpretation model are connected. The processor 220 may provide expanded data in which customer company data and third-party data (which has been estimated using the customer company data) are connected, and this expanded data may be provided to all the customers of the customer company or to a customer group selected by the customer company.

The processor 220 may utilize expanded data of the corresponding customer company for a service that targets the customer company. For example, the processor 220 may utilize the expanded data of the corresponding customer company for advertising targeting, for personalized recommendations, and for marketing related to the customer company. When the customer company desires to provide advertising to a customer of the customer company, the processor 220 may define an advertising targeting option by interpreting a target customer of the customer company with third-party data estimated through the interpretation model. For example, in an environment in which the server 150 that provides a search service is linked to an advertising platform, the processor 220 may estimate a search history with a target customer history of the customer company through the interpretation model, and may define expanded data including the estimated search history as the advertising targeting option. Here, the advertising platform may execute advertising according to a targeting option defined with the expanded data through estimation of third-party information that targets the target company of the customer company.

FIG. 4 illustrates an example of describing a process of pseudonymizing data of each company according to at least one example embodiment.

FIG. 4 illustrates pseudonym data of Company A (hereinafter, Company A pseudonym data) and pseudonym data of Company B (hereinafter, Company B pseudonym data).

Each company may itemize its own customer data according to the purpose of use. For example, Company A pseudonym data may include segment information for each customer of Company A, and Company B pseudonym data may include advertising targeting information for each customer of Company B.

Each company may configure customer data at the level of user identifiers (e.g., IDs, cookies, etc.) commonly maintained by both companies. Here, in configuring the pseudonym data, a pseudonym association key may be generated using user identification information and a salting process and/or a hashing function to pseudonymize the user identification information. User information may be pseudonymized such that a specific individual may not be identified without using additional information.

FIGS. 5 and 6 illustrate examples of describing pseudonym association data in which pseudonym data of each company is combined according to at least one example embodiment.

FIG. 5 illustrates an example of pseudonym association in which Company A pseudonym data and Company B pseudonym data of FIG. 4 are combined. The combining of pseudonym information may be performed through an external specialized association agency designated by the government, and the server 150 may receive, from the corresponding specialized association agency, the pseudonym association data in which Company A pseudonym data and Company B pseudonym data are combined.

FIG. 5 illustrates an example of the result of performing pseudonym association for Company A pseudonym data and Company B pseudonym data in an "inner join" form. The specialized association agency may combine data of both companies for customers (pseudonym association key) that Company A and Company B have in common.

When data of a data utilization agency is used for pseudonym association, the pseudonym association may also be performed in a "left join" form with respect to the data of the data utilization agency.

Referring to FIG. 6, when the combining of Company A pseudonym data and Company B pseudonym data is completed, the specialized association agency may delete the pseudonym association key from the combined data, and then may provide the same to the server 150. That is, the server 150 may receive and utilize the pseudonym association data in which the pseudonym association key has been deleted, as shown in the lower part of FIG. 6.

Hereinafter, a process of constructing an interpretation model using pseudonym association data is described.

Figure 7:
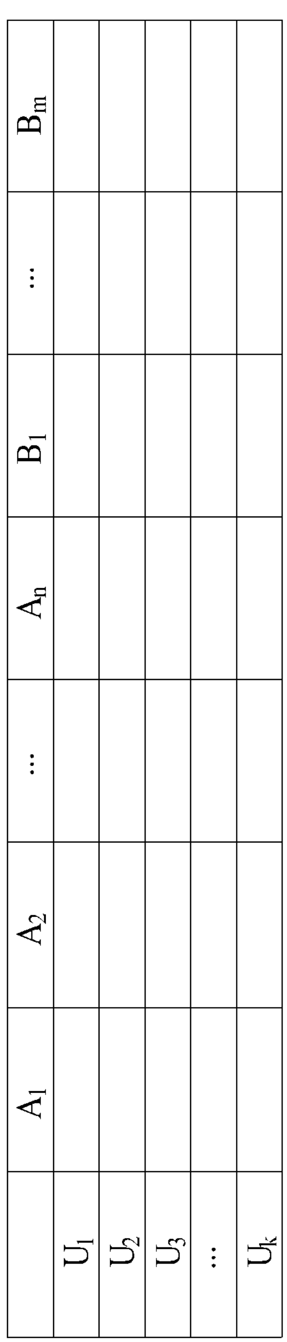
FIG. 7 illustrates an example of an issue addressed to construct an interpretation model according to at least one example embodiment.

FIG. 7 illustrates an example of an issue addressed to construct an interpretation model according to at least one example embodiment.

With the assumption that pseudonym association data in which Company A pseudonym data and Company B pseudonym data are combined to construct the interpretation model is as illustrated in FIG. 7, an issue regarding whether an arbitrary item user group of Company A may be inferred from item user information of Company B will be addressed next.

When items of Company A include $A_1, \ldots, A_n$ and items of Company B include $B_1, \ldots, B_m$, user $U_i$ may be defined as $[A_{i1}, \ldots, A_{in}, B_{i1}, \ldots, B_{im}]$, For example, the processor 220 may construct the interpretation model through a method of summarizing the pseudonym association data in table form.

One of simplest methods of summarizing original text without loss of information includes the form of $\{[A_1 \in a_1, \ldots, A_n \in a_n, B_1 \in b_1, \ldots, B_m \in b_m]$, number of users$\}$. In this case, since all combinations are stored, information of Company A may be accurately restored when information of Company B is given. Here, in the case of a combination in which the number of users is 1, an individual may be specified. Therefore, to prevent this, the case in which the number of users is 1 needs to be processed.

A method of processing data specified as one user by merging the data with another group may be used. The method may be performed such that a distance between groups increases while maximally maintaining homogeneity within each group. A method of using a distance that reflects an item-by-item importance or includes de-identifying some items with low importance may be used to minimize information loss of data by merge.

As another example, the processor 220 may construct the interpretation model through a method of summarizing pseudonym association data using similarity between items.

The processor 220 may process a relationship matrix between items of Company A and items of Company B, may combine the same with Company B user information, and may use the same to infer Company A user information. If solved as Equation 1 below, S has no user identifier information as correspondence information between items and accordingly the data seems relatively safe. However, in reality, since $B^{-1}$ is absent, the corresponding method may not be used immediately.

$$A = A_1, \ldots, A_n \quad \text{[Equation 1]}$$

$$B = B_1, \ldots, B_m$$

$$S = S^T B$$

$$A = (SB^{-1})T = B^{-1^T} S^T$$

This method may be transformed into a form of item-based collaborative filtering that is one of simple recommendation systems. This method may assign a high score to an item that is similar to an item previously consumed by a user. Similarity may be variously applied, including cosine similarity and Jaccard similarity. Modification, such as using a k-nearest neighbor (KNN), may be made.

S may be defined as in Equation 2 below, as a similarity matrix between items of Company A and items of Company B.

$$S_{ab} = \cos sim(A_a, B_b) = \frac{A_a \cdot B_b}{\|A_a\| \, \|B_b\|} \quad \text{[Equation 2]}$$

The consumption score of a user for an item of Company A may be defined as in Equation 3 below.

$$\text{Score}(u, a) = \frac{\sum_{beI(B)} B_{ub} S_{ab}}{\sum_{beI(B)} B_{ub}} = \frac{B_{u*} \cdot S_{a*}}{\|B_{u*}\|_2} \quad \text{[Equation 3]}$$

$$\text{Score} = BS^T/\text{row\_sum}(B)$$

As another example, the processor 220 may construct the interpretation model through a method of summarizing pseudonym association data using a logistic regression model.

Assuming that a joint distribution is the product of marginal distribution, the distribution for all joints, that is, all combinations, may be simply acquired.

The logistic regression model for each individual item may be expressed as $$f(A_i = a_i) = \beta_{i,0} + \sum_{j=1}^{m} \beta_{i,j} B_{i,j}.$$

The joint distribution for all combinations of combinations may be defined as Equation 4.

$$f(A_1 = a_1, \ldots, A_n = a_n) = \prod_{i=1}^{n} f(A_i = a_i) \quad \text{[Equation 4]}$$

By expanding this concept, a condition for two items may be regarded as a single event and $f(A_i=a_i, A_1=a_1)$ may be estimated. Also, a method of generating a model for every one of the combinations of main items and then estimating the distribution of remaining items may be considered.

As another example, the processor 220 may construct the interpretation model through a method of summarizing pseudonym association data using a deep learning model.

Figure 8:
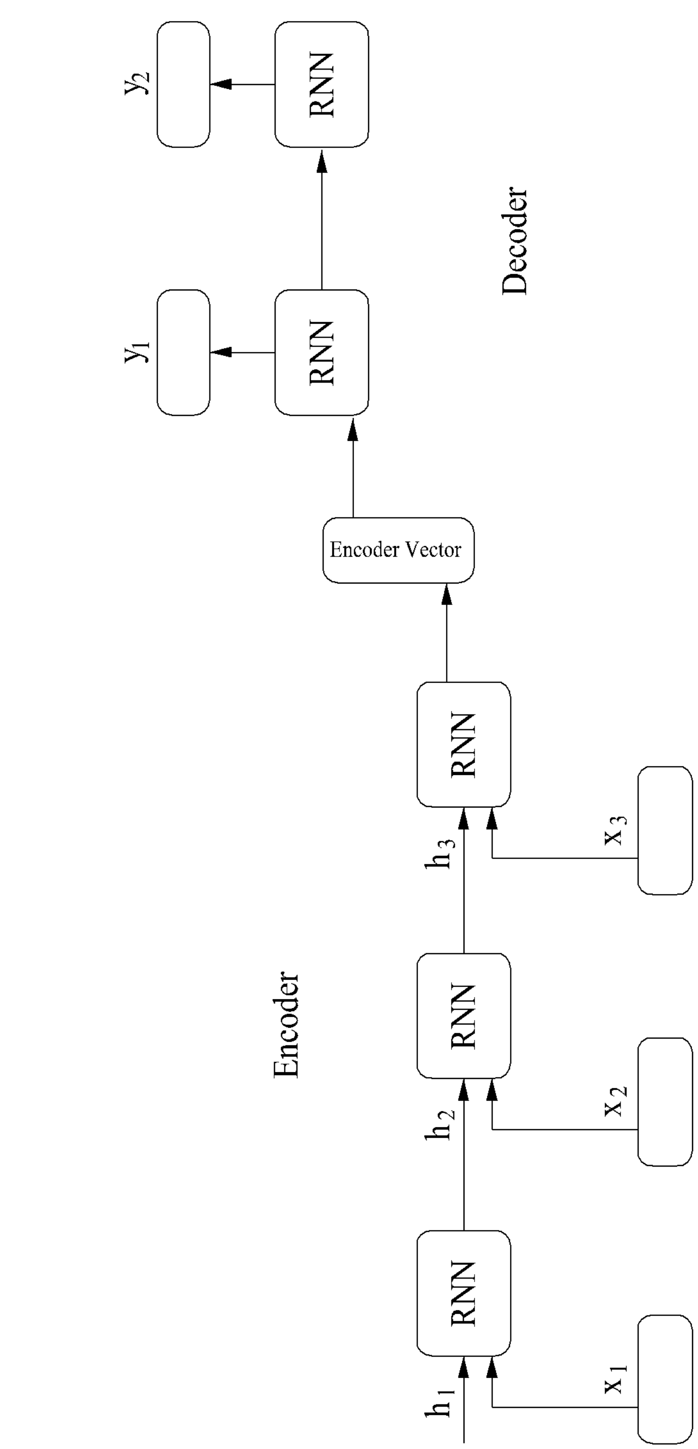
FIG. 8 illustrates an example of an encoder-decoder structure using a recurrent neural network (RNN) according to at least one example embodiment.

FIG. 8 illustrates an example of an encoder-decoder structure using a recurrent neural network (RNN) according to at least one example embodiment.

A sequence-to-sequence method that is a model for outputting a sequence of another domain from an input sequence may be used. Referring to FIG. 8, if an input sequence ($x_1$, $x_2$, $x_3$) and an output sequence ($y_1$, $y_2$) are configured using items of Company A and items of Company B, respectively, it may serve to interpret an input of an item of Company A as an item of Company B.

The example embodiments described herein are not limited to the aforementioned modeling methods and any modeling method capable of summarizing the pseudonym association data may be applied.

While modeling of a matching method that simply uses similarity of cookies or data has low accuracy, accuracy of a model may be secured with a most accurate combining method under the Personal Information Protection Act, or similar regulation, by constructing the interpretation model using a procedure of combining pseudonym information.

Also, the processor 220 may perform de-identification processing on the result of the interpretation model. For example, the processor 220 may reduce the re-identification probability of the model result in advance by pseudonymizing pseudonym association data in the process of constructing the interpretation model. As another example, the processor 220 may use pseudonym association data without modification and, here, may perform de-identification processing by performing a smoothing process or by adding an error such that the estimation result through the interpretation model does not specify an individual.

Also, the processor 220 may guarantee anonymity by verifying the re-identification probability. For example, the processor 220 may apply k anonymity of verifying whether the number of rows having the same attribute is k or more in the estimation result acquired using the entire data of a corresponding company as an input.

Figure 9:
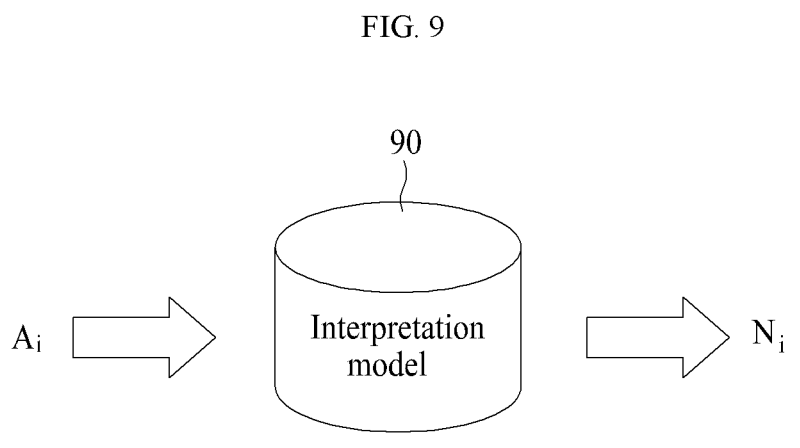

FIGS. 9 and 10 illustrate examples of describing a data expansion process using an interpretation model according to at least one example embodiment.

Referring to FIG. 9, the processor 220 may estimate information ($N_i$) of Company B using target information ($A_i$) of Company A through an interpretation model 90 that is modeled with pseudonym association data of Company A and Company B.

Data of all companies continuously varies without being fixed. Using the interpretation model 90, a change in input data of a company changes the estimation result of the interpretation model 90 and thus, the latest information may be estimated. In addition, integrated data may be continuously used by employing the interpretation model 90 that is constructed with pseudonym association data, without actually holding the pseudonym association data.

The processor 220 may expand Company A data by estimating Company B information ($N_i$) (which is another company or entity, i.e., a third party of Company A) using information ($A_i$) of Company A, that is, a customer company. Referring to FIG. 10, expanded data of Company A may be configured in a form in which Company A data and Company B information, which is estimated through the interpretation model 90, are connected with respect to all customers of Company A.

In an example in which Company A desires to execute advertising for VIP customers of Company A, in expanded data of FIG. 10, if $A_1$ is an item regarding whether a corresponding customer is one of Company A's VIP (1 if VIP and 0 if not VIP), and if $N_i$ is an advertising targeting option item of Company B, a characteristic of a user for which $A_1$ is 1 (VIP group of Company A) may be represented as $N_i$. In the case of executing advertising with a combination of corresponding characteristics (combination of targeting options), advertising may be executed for the VIP group of Company A.

Assuming that Company B is an advertising platform company, and that such an advertising platform of Company B does not have information on VIP customers of Company A. Therefore, advertising may not be executed for Company A's VIP customers, and only low-resolution targeting may be possible with customer characteristics that have been analyzed using Company A data. For example, if the main ages of VIP customers are in their 30s and they are females, targeted advertising may be performed under wide conditions of people in their 30s that are also female.

On the contrary, through the example embodiment, Company B's advertising platform uses Company B data estimated with Company A data as well as Company A data. Therefore, characteristics of VIP customers of actual Company A may be expressed with Company B data, making it possible to reach Company A's customers with more accurate and precise targeting. In the example embodiment, history of Company B may be estimated using data of Company A, "30s & female," and more detailed targeting options may be defined through this.

As described above, according to some example embodiments, it is possible to continuously and legally estimate and utilize third-party data while protecting individual privacy through pseudonym association. According to some example embodiments, it is possible to secure accuracy of a model and ensure up-to-dateness of data by constructing the model configured to estimate third-party data with first-party data using pseudonym association data. According to some example embodiments, it is possible to expand data to be utilized by estimating third-party data using a link between data through a model constructed using pseudonym association data. According to some example embodiments, it is possible to apply to enhancing targeting, such as advertising execution and personalized recommendation, through combination with not only first-party data but also third-party data estimated through a pseudonym association-based model.

The systems or the apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer-readable storage mediums.

The methods according to the example embodiments may be recorded in non-transitory computer-readable media including program instructions executable through various computer methods. Here, the media may continuously store computer-executable programs or may transitorily store the same for execution or download. Also, the media may be various types of recording devices or storage devices in a form in which one or a plurality of hardware components are combined. Without being limited to a media directly connected to a computer system, the media may be distributed over the network. Examples of non-transitory computer-readable media include magnetic media such as hard disks, floppy disks, and magnetic tapes; optical media such as CD ROM disks and DVD; magneto-optical media such as floptical disks; and hardware devices that are specially designed to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A third-party data providing method performed by a computer system providing a data platform comprising at least one processor configured to execute computer-readable instructions included in a memory, the method comprising:

receiving, by the at least one processor, pseudonym association data from an external institution in which in the pseudonym association data first-party information of a customer company and third-party information of an entity other than the customer company are pseudonymized and combined such that individual privacy of the third-party information is maintained;

generating, by the at least one processor, an interpretation model for data estimation by modeling the pseudonym association data;

estimating, by the at least one processor, the third-party information using target information of the customer company through the interpretation model; and providing, by the at least one processor, the estimated third-party information for a service related to the customer company, wherein the providing comprises utilizing the target information and the estimated third-party information for at least one of advertising targeting for the customer company or targeted personalized recommendation for the customer company.

2. The method of claim 1, wherein the generating comprises pseudonymizing and de-identifying the pseudonym association data.

3. The method of claim 1, wherein the generating comprises de-identifying the pseudonym association data through at least one of a process of smoothing the pseudonym association data and a process of adding an error to the pseudonym association data.

4. The method of claim 1, wherein the generating comprises generating the interpretation model through:

a method of summarizing the pseudonym association data in a table form, a method of summarizing the pseudonym association data using similarity between items, or a method of modeling the pseudonym association data using a logistic regression model or a deep learning model.

5. The method of claim 1, wherein the generating comprises deleting the pseudonym association data after generation of the interpretation model is completed.

6. The method of claim 1, wherein the providing comprises providing the customer company with expanded data in which the target information and the estimated third-party information are connected.

7. The method of claim 1, wherein:

the estimating comprises estimating third-party data using first-party data of a target customer of the customer company using the interpretation model, and the providing comprises defining expanded data in which the first-party data and the third-party data are connected as an advertising targeting option for the target customer.

8. The method of claim 1, wherein the external institution is an external specialized association agency, and wherein the receiving comprises receiving pseudonym association data in which a pseudonym association key is deleted.

9. The method of claim 1, wherein the receiving comprises receiving the pseudonym association data in which pseudonym data of the customer company and pseudonym data of at least one third party selected as a target company for information use by the customer company are combined.

10. A non-transitory computer-readable recording medium storing instructions that, when executed by a processor, cause the processor to computer-implement the third-party data providing method of claim 1.

11. A computer system providing a data platform comprising:

at least one processor configured to execute computer-readable instructions included in a memory, wherein the at least one processor is configured to process:

a process of receiving pseudonym association data from an external institution in which in the pseudonym association data first-party information of a customer company and third-party information of an entity other than the customer company are pseudonymized and combined such that individual privacy of the third-party information is maintained;

a process of generating an interpretation model for data estimation by modeling the pseudonym association data;

a process of estimating the third-party information using target information of the customer company through the interpretation model; and a process of providing the estimated third-party information for a service related to the customer company, wherein the providing comprises utilizing the target information and the estimated third-party information for at least one of advertising targeting for the customer company or targeted personalized recommendation for the customer company.

12. The computer system of claim 11, wherein the at least one processor is configured to pseudonymize and de-identify the pseudonym association data.

13. The computer system of claim 11, wherein the at least one processor is configured to de-identify the pseudonym association data through at least one of a process of smoothing the pseudonym association data and a process of adding an error to the pseudonym association data.

14. The computer system of claim 11, wherein the at least one processor is configured to generate the interpretation model through:

a method of summarizing the pseudonym association data in a table form, a method of summarizing the pseudonym association data using similarity between items, or a method of modeling the pseudonym association data using a logistic regression model or a deep learning model.

15. The computer system of claim 11, wherein the at least one processor is configured to delete the pseudonym association data after generation of the interpretation model is completed.

16. The computer system of claim 11, wherein the at least one processor is configured to provide the customer company with expanded data in which the target information and the estimated third-party information are connected.

17. The computer system of claim 11, wherein the at least one processor is configured to:

estimate third-party data using first-party data of a target customer of the customer company using the interpretation model, and define expanded data in which the first-party data and the third-party data are connected as an advertising targeting option for the target customer.

18. The computer system of claim 11, wherein the at least one processor is configured to receive the pseudonym association data in which pseudonym data of the customer company and pseudonym data of at least one third party selected as a target company for information use by the customer company are combined.

* * * * *